Feb. 15, 1949.  G. KLEIN  2,461,902
DETACHABLE OVEN DOOR
Filed Jan. 10, 1946  2 Sheets-Sheet 1
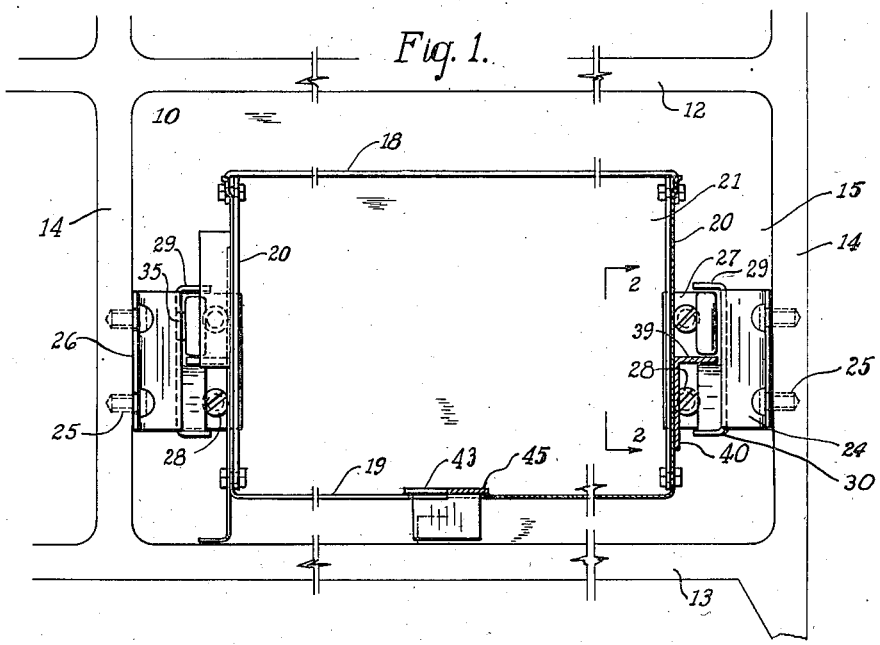
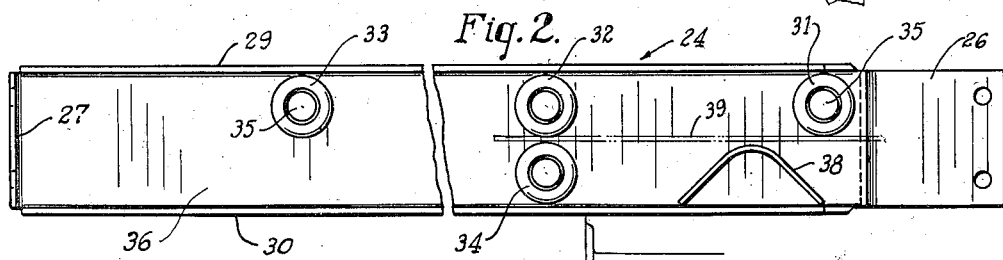
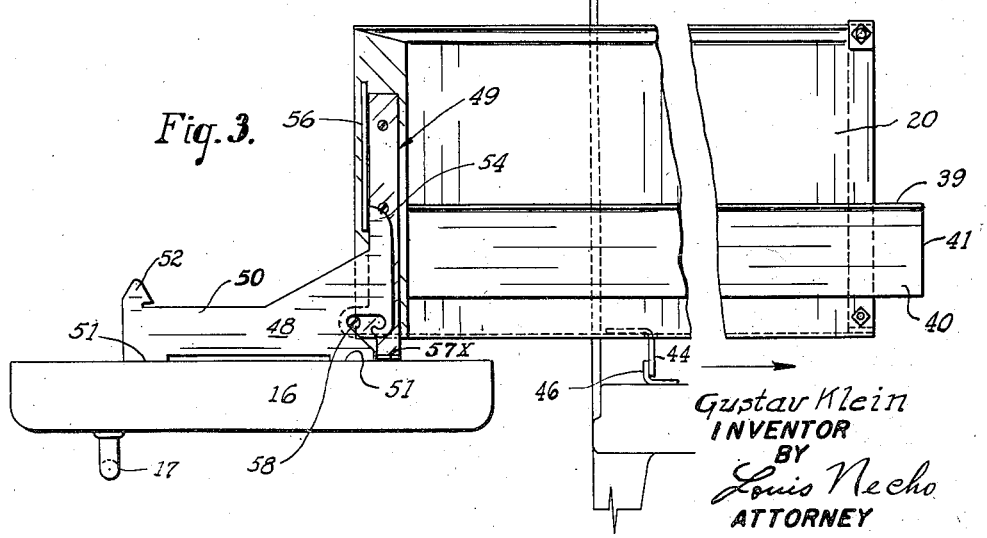
Gustav Klein
INVENTOR
BY
Louis Necho
ATTORNEY Feb. 15, 1949. G. KLEIN 2,461,902
DETACHABLE OVEN DOOR
Filed Jan. 10, 1946 2 Sheets-Sheet 2
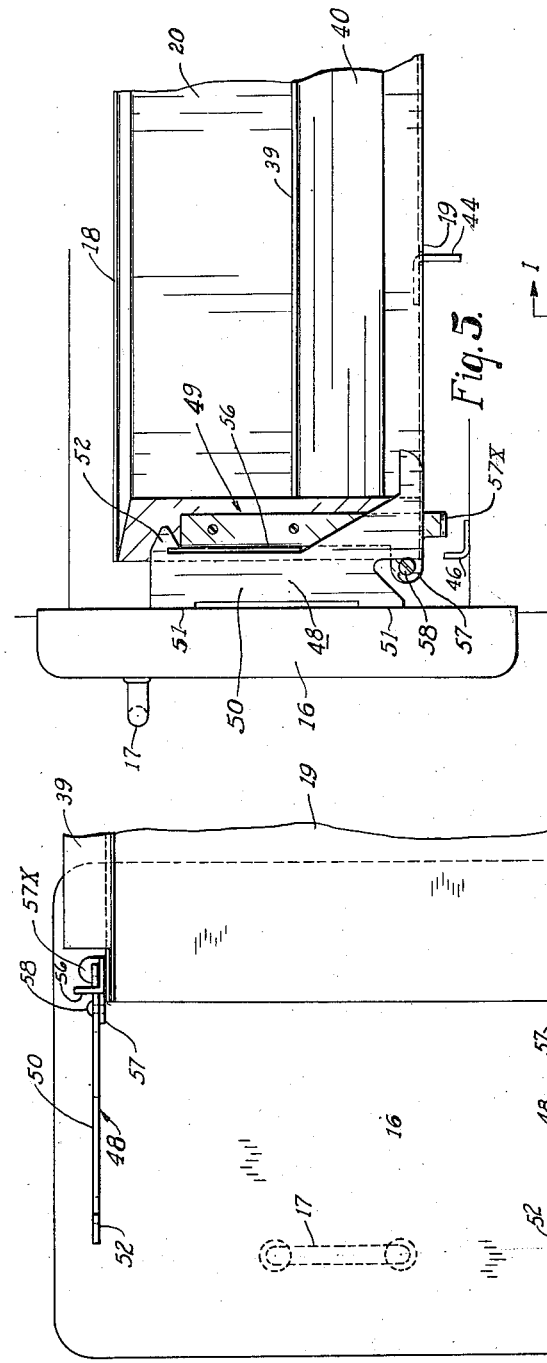
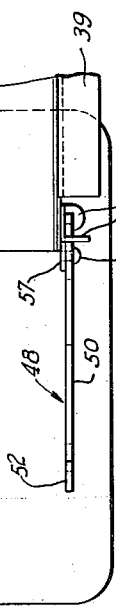
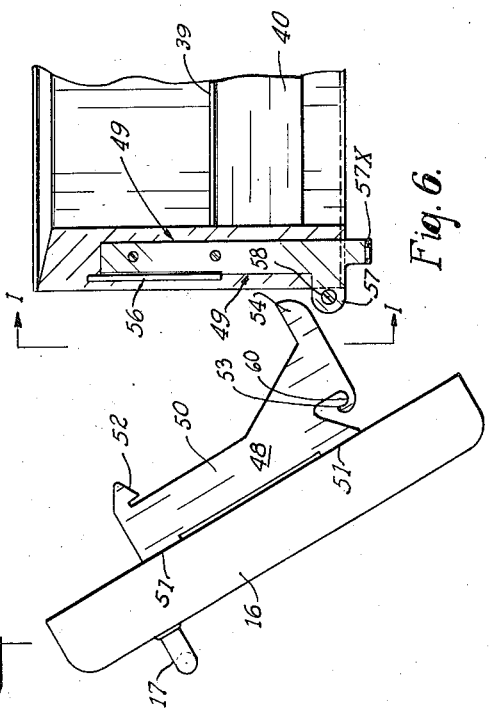
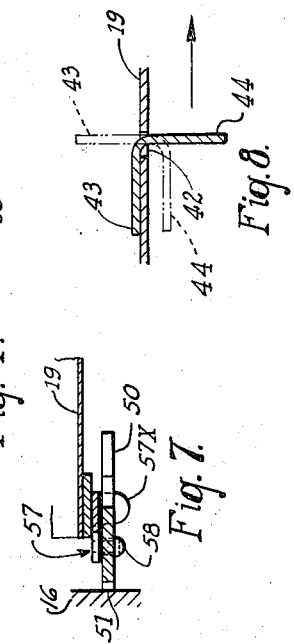
Gustav Klein
INVENTOR
BY Louis Necho
ATTORNEY Patented Feb. 15, 1949

2,461,902

UNITED STATES PATENT OFFICE 2,461,902

DETACHABLE OVEN DOOR

Gustav Klein, Melrose Park, Pa., assignor to Caloric Gas Stove Works, Philadelphia, Pa.

Application January 10, 1946, Serial No. 640,341

2 Claims. (Cl. 126—194)

1

The broiler compartment of a stove is provided with a sliding drawer which can be pulled out for receiving the food to be cooked or for removing the cooked food. The drawer is also provided with a door which is hinged along its bottom edge so that it may be swung into a horizontal position which is substantially in the plane of the bottom of the drawer.

Due to the fact that the broiler compartment is used for open cooking, that is, for broiling steaks, etc., fat and meat juices drip and sputter thus necessitating frequent and thorough scrubbing of the drawer and door of the compartment. To this end, it has heretofore been proposed to make the drawer removable from the compartment but, as far as I am aware, the difficulty in removing the drawers of prior constructions has been such that the average housewife rarely, if ever, attempts removing the drawer and washes it the best she can.

However, the combined weight of the drawer and the door carried thereby makes removal of the same difficult and it is, therefore, an object of the invention to produce an improved construction in which the door may be readily detached from the drawer, prior to removal of the drawer from the broiler compartment, by merely moving the door slightly upwardly and horizontally and without having to disengage any fastening devices such as screws, bolts, hinges or the like.

A further object of the invention is to produce an improved detachable door which will be easy to make and to operate, which will be strong and durable, and which, when in the closing position will tightly close the access opening of the oven or broiler compartment.

These and other objects are attained by my invention as set forth in the following specification and the accompanying drawings, in which:

Fig. 1 is a fragmentary and diagrammatic view, partly in section and partly in front elevation, of a broiler compartment structure embodying my invention;

Fig. 2 is a side elevational view looking in the direction of the line 2—2 on Fig. 1, showing the mounting of the antifriction means;

Fig. 3 is a side elevational view of the drawer and the door carried thereby, the door being shown in the fully open position;

Fig. 4 is a top plan view of the structure shown in Fig. 3;

Fig. 5 is a fragmentary, side elevational view

2 of the drawer and door, the door being shown in the fully closed position;

Fig. 6 is a view, similar to Fig. 5, illustrating the manner of removing the door from the drawer; and Figs. 7 and 8 are fragmentary, sectional views showing details of construction.

In Fig. 1 of the drawings, there is diagrammatically shown the lower right-hand portion of a cooking gas stove in which the broiler compartment 10 is usually located. The broiler compartment is defined by the usual, insulated top and bottom walls 12 and 13, the side walls 14 and the rear wall 15. The front of the compartment is open and is adapted to be closed by a door 16 having a handle 17.

The compartment 10 is adapted to accommodate a U-shaped sliding drawer formed of a bottom wall 19 and side walls 20. The sliding drawer is provided with adjustable shelves, not shown, for supporting the food to be cooked in proper spaced relation to a source of heat, not shown, such as a gas burner carried by the top wall of the broiler compartment.

According to my invention, I mount the antifriction means on the side walls 14 of the broiler compartment, instead of on the side walls of the sliding drawer, and I provide the side walls of the drawer with readily accessible and easily dried means for engaging the antifriction means so as to guard against the antifriction means becoming wet and rusty. As best shown in Figs. 1 and 2, a bracket 24, of the desired length and width, is secured to each side wall 14 of the broiler compartment by means of screws 25 engaging an angle flange 26 at the front or outer end of the bracket and by means of screws 28 engaging a turned in flange 27 at the rear or inner end of the bracket and the rear wall 15 of the broiler compartment. Each bracket 24 is also provided with upper and lower flanges 29 and 30 which serve as bearing surfaces for a plurality of roller bearings 31, 32, 33 and 34. The bearings are journalled on pins 35 carried by the side wall of the bracket. Carried by the lower flange 30 of each bracket is a support 38 the top of which is lower than the top of the adjacent bearing 34.

The sliding drawer is provided with side flanges 39 adapted to slide between the rollers 31, 32 and 33 and the roller 34, as shown in solid lines in Fig. 1 and in broken lines in Fig. 2. The flanges 39 may be provided in any desired manner, but, as shown, the flanges constitute the horizontal portions of angle members, the vertical walls 40 of which are suitably secured to the exterior of the side walls of the sliding drawer.

By this construction, the flanges 39 ride on the rollers 34 and bear against the rollers 31, 32 and 33 as the drawer is moved inwardly or outwardly relative to the broiler compartment.

When the sliding drawer is pulled outwardly so as to permit ready access to the innermost end of the drawer, the flanges 39 will only be supported by the rollers 32 and 34 only and, in the absence of any other support, the strain on the flanges might be excessive and, regardless of the strength of the flanges, the drawer will tend to assume a downwardly inclined position. In this outermost position of the drawer, the flanges 39 will rest on the supports 38 so as to maintain the drawer in a substantially horizontal position.

It will be noted that, by this construction, the roller bearings can not get wet when the drawer is removed, washed and replaced in position, and that the side flanges 39, being flat and readily accessible, can be thoroughly dried before again coming in contact with the roller bearings. This prevents rusting of the bearings and eliminates the expense and inconvenience of servicing on that account.

In order to prevent accidental withdrawals of the drawer completely from the broiler compartment while permitting ready removal and reinsertion of the drawer from or into the compartment, I provide the bottom wall 19 of the drawer with a slot 42 in which is mounted a latch formed of angularly disposed plates 43 and 44. The plate 43 is made wider at the front edge 45 thereof than the length of the slot to prevent the latch from falling through the slot and to make the weight of the upper plate 43 greater than the weight of the lower plate 44.

By this arrangement, when the plate 44 is passed through the slot 42 and the latch is released, it will, by gravity, automatically assume its locking position as shown in Figs. 1 and 8 in which the upper plate 43 rests in a horizontal position on the bottom of the drawer and the plate 44 depends at a right angle thereto. When it is desired completely to remove the drawer, the operator moves the latch to the position shown in dotted lines in Fig. 8, in which the bottom plate lies flat against the bottom of the drawer and the plate 43 is vertically disposed. In this position, the plate 44 clears the keeper 46 near the front end of the bottom wall 19 of the broiler compartment. When the drawer is inserted into the compartment, in the direction of the arrows in Figs. 3 and 8, the pendant wall 44 of the latch strikes the keeper 46 and the latch is automatically rotated in clockwise direction, as viewed in Fig. 3, so as to assume the position shown in dotted lines in Fig. 8. As soon as the latch clears the keeper 46, it automatically resumes the position shown in Fig. 3, in which it limits the extent to which the drawer may be withdrawn. The latch is so located as to permit withdrawal of the drawer to an extent sufficient to permit access to the rearmost portion of the drawer. It will thus be seen that the latch can be operated with no skill and with very little effort, so that the drawer may be completely removed or replaced without disengaging or re-engaging any fastening means such as screws or the like.

In order to enable the housewife to remove the door 16 of the broiler compartment for separate cleaning or preparatory to removal of the drawer, I have provided simple and readily operable means whereby the door may be engaged or disengaged. As shown, the door is provided with a pair of latches 48, one near each vertical edge thereof, (Figs. 4 and 5) and I have provided a pair of keepers 49, one near each vertical front edge of the side walls 20 of the drawer. Each of the latches includes a body portion 50 which is secured at its outer edge to the inner face of the door, as at 51, an upper inner hook portion 52, a lower, outer hook 53, and an inner lug or ear 54. Each of the keepers 49 includes an upper right angle flange 56 and a lower lug 57 from which a pin 58 projects horizontally beyond the vertical plane of the body portion 59 of the keeper.

To secure the door 16 to the front or outer end of the drawer, the door is moved downwardly and at an angle to the vertical, in such a manner as to cause the pins 58 to enter the openings defined by the hooks 53 and the adjacent curved walls of the latches 48. The upper part of the drawer is then moved to the right, as viewed in Figs. 5 and 6, in such a manner as to cause the hooks 52 to engage the upper edges of the angle walls 56 of the keepers. See Fig. 5. In this position, the pins 58 act as horizontal axes or trunnions about which the door may be rotated from its vertical, closed, to its fully open, horizontal position. It will be noted that, when the door is in its horizontal position, the ears 54 abut the inner faces of the angle walls 56, and the lower portions of the door abut lugs 57x at the lower ends of the keepers 49, to limit the rotation of the door, as shown in Fig. 3.

To open the door, it is merely necessary to move it upwardly until the hooks 52 clear the upper edges of the angle plates 56, whereupon the door may be swung about the pins 58 as axes. It will be noted that, for this purpose, the openings defined by the hooks 53 are big enough to provide the necessary play and that the curved surfaces 60 provide bearings for rotation of the door on the pins 58.

To disengage the door completely from the drawer, the door is first partly opened to disengage the hooks 52 in the manner explained above, and the door is then so maneuvered as to disengage the hooks 53 from the pins 58. It can readily be seen that this can be done without any skill and with very little effort. Also that no special fastening devices such as screws or the like are employed.

The sliding drawer is preferably made of one piece and the junctions of the side walls thereof with the bottom wall are preferably rounded so as to facilitate cleaning.

What I claim is:

1. In a cooking stove, a first wall structure defining an oven compartment having top and bottom walls, side walls and a rear wall and provided with a front access opening, a second wall structure defining a drawer having a bottom wall and side walls, said drawer being of a size to fit within said compartment, a door for closing the front opening of said compartment and means for detachably hingedly securing said door to the front end of said drawer, said means including keeper members carried by the front end of the drawer and latch members carried by the inner side of the door, said latch members being engageable with, and disengageable from said keeper members without removing any of said keeper members or said latch members and without moving any of said keeper members or said latch members relative to said drawer or said door respectively.

2. A wall structure defining a compartment having a front access opening, a drawer slidably mounted in said compartment, a door for closing said opening, and means for detachably mounting said door on the front end of said drawer, said means including a keeper carried by the upper portion of the front end of said drawer, an elongated bracket carried by the inner side of said door, a hook carried by the upper, inner portion of said bracket for engaging said keeper, a pin extending laterally from the lower portion of the side of said drawer, and a hook carried by the lower, outer portion of said bracket for detachably engaging said pin, said hook including an elongated slot, and a passage leading to one end of said slot through which said pin may be moved into or withdrawn from said slot.

GUSTAV KLEIN.

REFERENCES CITED

The following references are of record in the file of this patent:

UNITED STATES PATENTS

| Number | Name | Date |
| --- | --- | --- |
| 241,439 | Steinmetz et al. | May 10, 1881 |
| 1,388,851 | Cordes | Aug. 30, 1921 |
| 1,851,855 | Lindemann et al. | Mar. 29, 1932 |
| 1,926,453 | Pipe | Sept. 12, 1933 |
| 1,960,365 | Barker | May 29, 1934 |
| 2,070,064 | Pasinski | Feb. 9, 1937 |
| 2,089,327 | Barker | Aug. 10, 1937 |
| 2,113,543 | Haley | Apr. 5, 1938 |